March 25, 1930.  H. G. JORGENSEN  1,751,699
ANTIRATTLER FOR WINDOWS
Filed Dec. 19, 1923
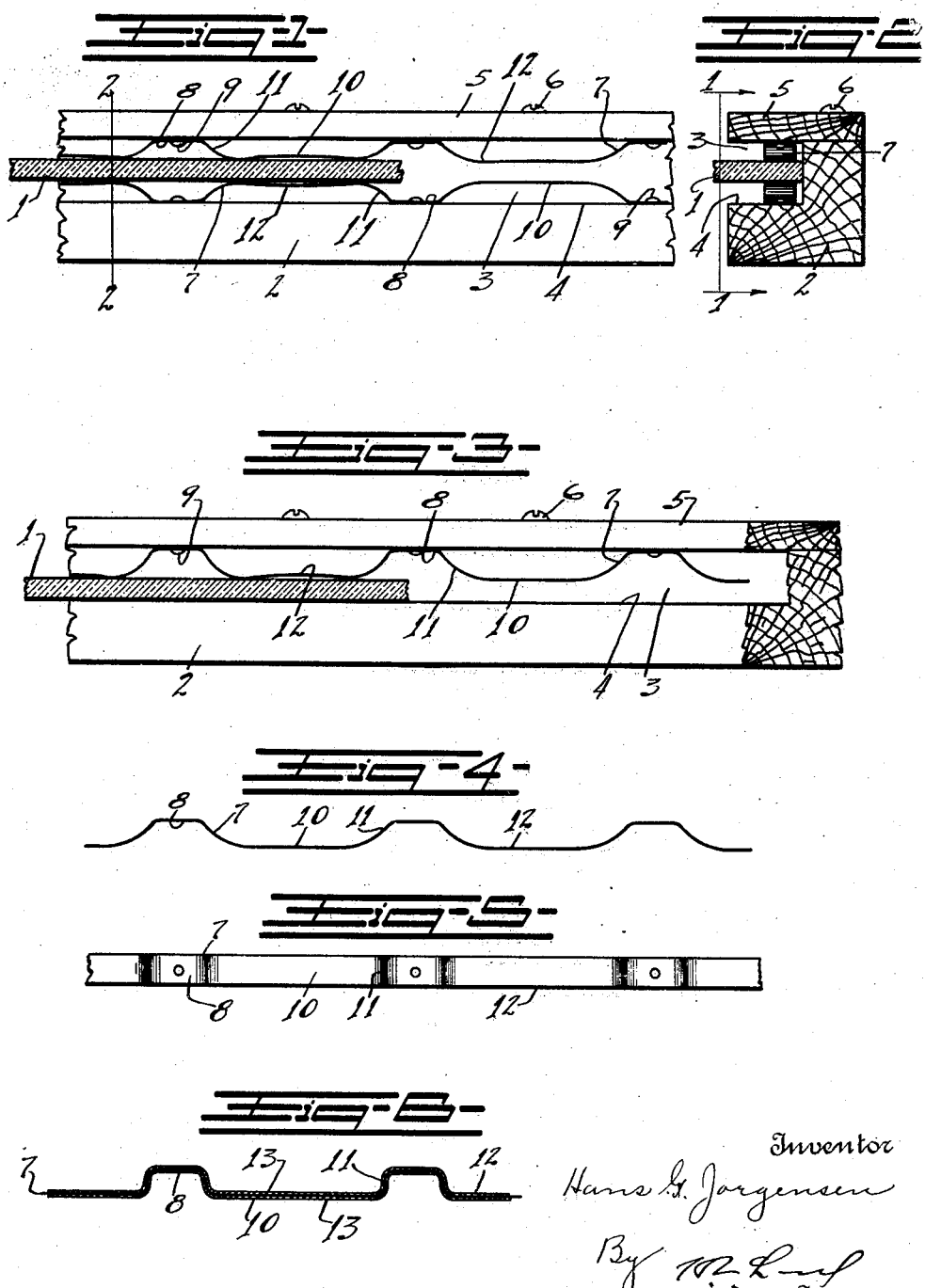

Patented Mar. 25, 1930

1,751,699

UNITED STATES PATENT OFFICE

HANS GOTFRED JORGENSEN, OF ERIE, PENNSYLVANIA

ANTIRATTLER FOR WINDOWS

Application filed December 19, 1923. Serial No. 681,495.

The invention is particularly designed to cushion and prevent rattles in the movable glass windows ordinarily used with automobiles. These are subjected to very severe shocks and still the structure should be such that the glass may be readily moved, the glass being carried in the frame directly without an interposing edge or sash.

The invention is illustrated in the accompanying drawings as follows:—

Fig. 1 shows a section on the line 1—1 in Fig. 2.

Fig. 2 is a section on the line 2—2 in Fig. 1.

Fig. 3 a view similar to Fig. 1 of an alternative construction.

Fig. 4 a side elevation of one of the spring strips.

Fig. 5 a front elevation of a strip.

Fig. 6 a section of a spring strip having a soft or fibre coating thereon.

1 marks the glass and 2 the frame, the frame being ordinarily part of the automobile body or door. The window frame has the groove 3 formed with a wall 4 in the frame itself and the removable stop or strip 5 secured to the frame by screws 6.

A flat metal spring 7 is arranged at each side of the glass. This is made of relatively flat securing portions 8 which are secured to one wall of the groove 3 by nails or screws 9. Loops 10 are arranged between the securing portions, the loops having outwardly extending portions 11 with crests 12. The outward portions 11 are so dimensioned as to bring the crests 12 slightly closer together than the thickness of the glass. As the glass is forced into place between the loops the loops are forced apart slightly the crests 12 being depressed. This makes an easy sliding fit with the glass and still secures the glass against rattling.

The strips may be readily secured in place, the strips being preferably arranged in long lengths which are simply cut off to satisfy the requirement of each case.

While I prefer to have the loops at each side of the glass as giving greater variation for thickness of the glass in some instances but a single spring may be used as clearly shown in Fig. 3. It will be noted, however, that where the double spring is used the yielding quality of the support of the glass relieves the glass somewhat of shocks so that the breaking of the glass from shocks is obviated and where the springs are arranged at both sides there is a yielding support against shock in both directions whereas in Fig. 3 the yielding support is only in one direction.

In some instances it may be desirable to pad the metallic part of the spring with a soft or fibre stock and this may be done by securing by adhesive materials a fibre stock 13 on the metal strip, the metal strip being ordinarily formed of spring brass.

What I claim as new is:—

1. In an anti-rattler for windows, the combination of a frame having a groove therein with opposing walls; a glass member mounted in the groove; and a spring at each side of the glass member exerting yielding pressure against the member, each of said springs comprising a spring loop operating against the member and leaving its entire length superimposed by the member, said loop being rigidly secured at its ends to a wall of the groove and yielding intermediate said ends.

2. In an anti-rattler for windows, the combination of a frame having a groove therein with opposing walls; a glass member mounted in the groove; and a spring at each side of the glass member exerting yielding pressure against the member, each of said springs comprising a spring loop operating against the member and having its entire length superimposed by the member, said loop being rigidly secured at its ends to a wall of the groove, said loop having a yielding portion intermediate its ends formed with a flat crest at the center.

In testimony whereof I have hereunto set my hand.

HANS GOTFRED JORGENSEN.